(12) United States Patent
Mitsuhashi et al.

(10) Patent No.: US 10,725,594 B2
(45) Date of Patent: Jul. 28, 2020

(54) TOUCH PANEL AND MANUFACTURING METHOD THEREOF

(71) Applicant: Futaba Corporation, Mobara-shi, Chiba-ken (JP)

(72) Inventors: Tsubasa Mitsuhashi, Mobara (JP); Masashi Miyagawa, Mobara (JP); Kiyoyuki Deguchi, Mobara (JP); Tomohiro Ishii, Mobara (JP); Yasuyuki Naito, Mobara (JP)

(73) Assignee: FUTABA CORPORATION, Mobara-shi (JP)

( * ) Notice: Subject to any disclaimer, the term of this patent is extended or adjusted under 35 U.S.C. 154(b) by 0 days.

(21) Appl. No.: 15/925,866

(22) Filed: Mar. 20, 2018

(65) Prior Publication Data

US 2018/0275797 A1    Sep. 27, 2018

(30) Foreign Application Priority Data

Mar. 23, 2017   (JP) ................................ 2017-057680
Sep. 19, 2017   (JP) ................................ 2017-178993

(51) Int. Cl.
*G06F 3/044*    (2006.01)
*G06F 3/041*    (2006.01)

(52) U.S. Cl.
CPC ............ *G06F 3/044* (2013.01); *G06F 3/0414* (2013.01); *G06F 2203/04103* (2013.01); *G06F 2203/04107* (2013.01)

(58) Field of Classification Search
CPC .................. G06F 3/0414; G06F 3/044; G06F 2203/04103; G06F 2203/04107
See application file for complete search history.

(56) References Cited

U.S. PATENT DOCUMENTS

| | | | | |
|---|---|---|---|---|
| 2008/0227499 | A1* | 9/2008 | Suzuki ................. | G06F 1/1616 455/566 |
| 2013/0319137 | A1* | 12/2013 | Grau ...................... | G06F 3/005 73/862.381 |
| 2014/0325440 | A1* | 10/2014 | Kondo .................. | G06F 3/0488 715/814 |
| 2015/0070309 | A1 | 3/2015 | Kang | |
| 2015/0293629 | A1* | 10/2015 | Ryu ....................... | G06F 3/044 345/174 |

(Continued)

FOREIGN PATENT DOCUMENTS

| | | |
|---|---|---|
| JP | 2013-132783 A | 7/2013 |
| JP | 2013-246741 A | 12/2013 |

(Continued)

OTHER PUBLICATIONS

Taiwan Office Action issued in corresponding Taiwan Patent Application No. 107109654 dated Jan. 9, 2019 and English translation thereof.

(Continued)

*Primary Examiner* — Nelson M Rosario
(74) *Attorney, Agent, or Firm* — Bacon & Thomas, PLLC

(57) ABSTRACT

A touch panel includes a sensor unit. The sensor unit includes a base film stretched by heat, an electrode portion, which is made of a mixture of a conductive material and a thermoplastic resin and is formed on at least one surface of the base film, and a stretching supporting layer made of a thermoplastic resin to cover the electrode portion.

5 Claims, 13 Drawing Sheets

<BEFORE THREE-DIMENSIONAL MOLDING>

<AFTER THREE-DIMENSIONAL MOLDING>

(56) References Cited

U.S. PATENT DOCUMENTS

2016/0160067 A1    6/2016  Xia et al.
2017/0249037 A1    8/2017  Sato et al.
2018/0371619 A1*  12/2018  Tsukamoto ............. B32B 15/04

FOREIGN PATENT DOCUMENTS

TW    201512322 A    4/2015
TW    201514817 A    4/2015
TW    201640297 A   11/2016

OTHER PUBLICATIONS

Office Action dated Dec. 3, 2019 issued in corresponding Japanese Application No. 2017-178993 and English translation thereof.

* cited by examiner

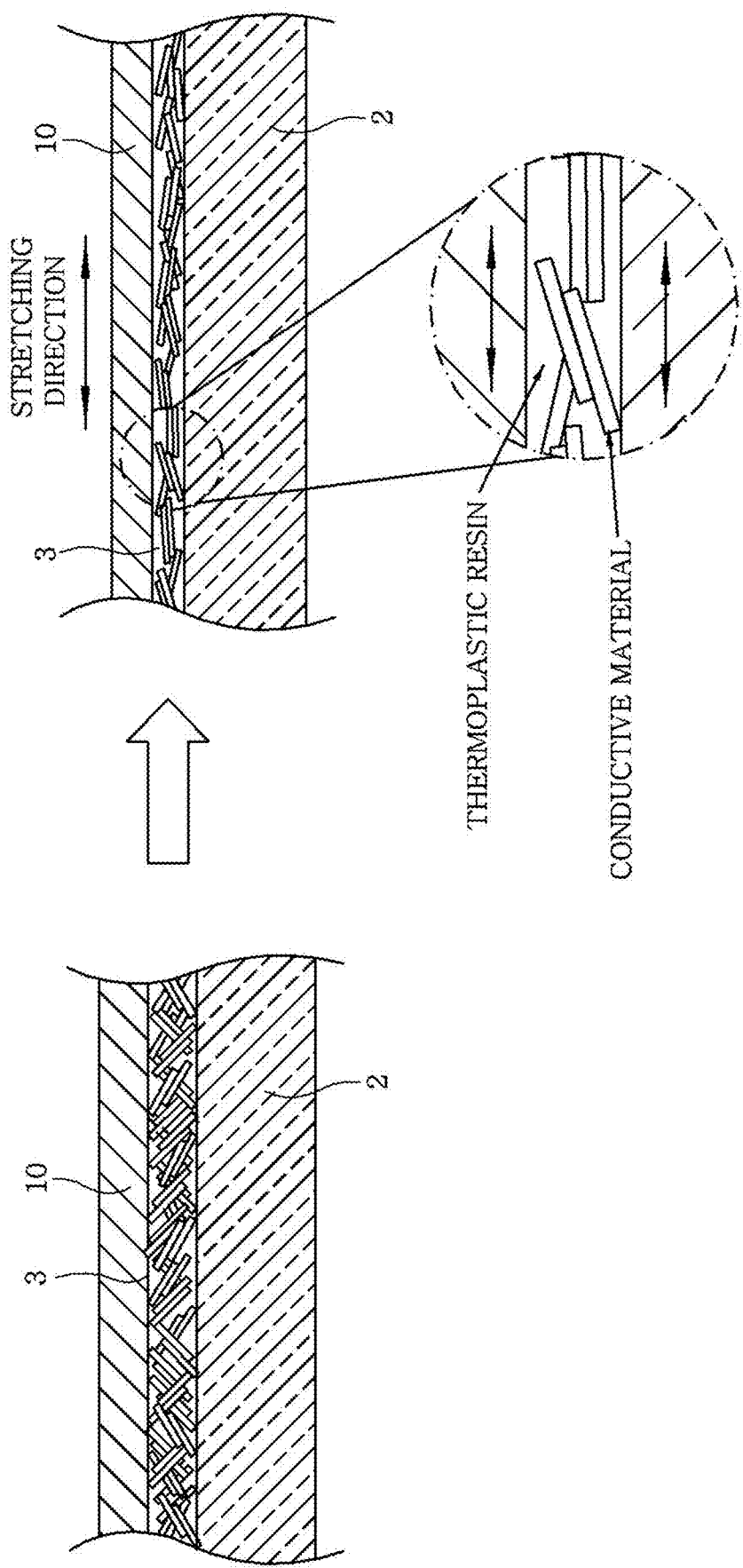

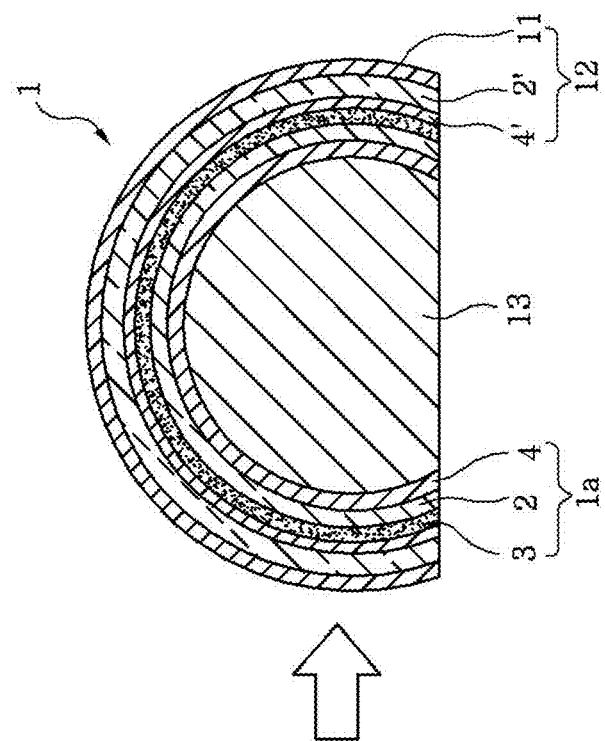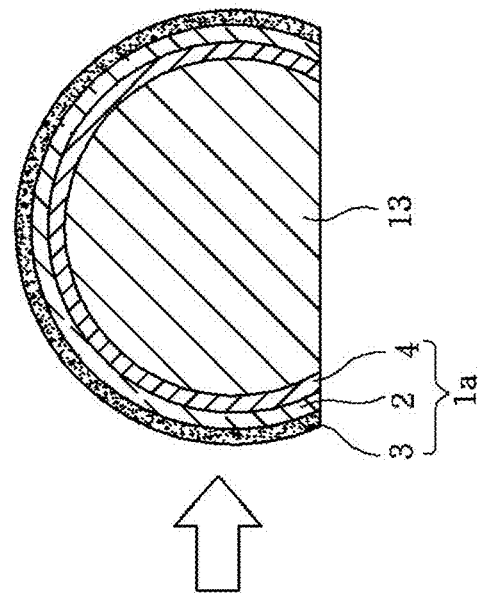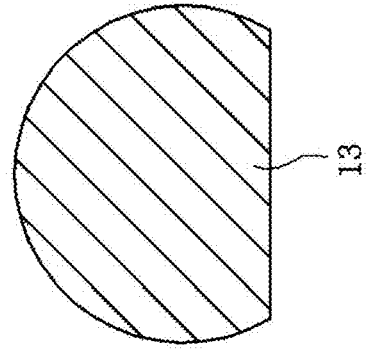

TOUCH PANEL AND MANUFACTURING METHOD THEREOF

FIELD OF THE INVENTION

The present disclosure relates to a touch panel obtained by three-dimensionally forming a sensor unit having an electrode portion on a surface of a base film, and a manufacturing method thereof.

BACKGROUND OF THE INVENTION

Japanese Patent Application Publication No. 2011-090443 discloses a projection type capacitance touch panel in which a column electrode extending in a first direction and a row electrode extending in a second direction intersecting the first direction are formed on one surface of a single base.

The touch panel disclosed in Japanese Patent Application Publication No. 2011-090443 may be used as a flat panel or may be molded in a predetermined three-dimensional shape depending on the purpose. For example, a touch panel having a hemispherical shape obtained by molding a flat film sensor may be installed in a driver seat of a vehicle, and the touch panel may be used for a driver's manipulation using finger touch.

A touch panel having such a hemispherical shape or another three-dimensional shape is generally molded by thermoforming. When the thermoforming is performed, materials need to be stretched. Therefore, a base film is made of, e.g., PET film/sheet and PC film/sheet. Further, an electrode is made of a metal that is stretched during thermoforming (e.g., copper or indium); powdered silver mixed with a resin binder; PEDOT (polyethylene dioxythiophene) or the like.

In vacuum forming, which is one of the thermoforming methods, a film sensor is disposed above a mold in a vacuum chamber with an electrode facing up. The film sensor is heated by infrared rays from the electrode side while maintaining the vacuum chamber in a vacuum state, and the film sensor is stretched by pressing the mold disposed below the film sensor toward the film sensor. Therefore, the film sensor is formed in a three-dimensional shape.

Further, in a case when a decorative film is attached to the film sensor thus formed, an OCA (Optical Clear Adhesive) is provided as an adhesive agent on a bottom surface of a decorative film having a predetermined pattern, and the decorative film is laminated on the three-dimensionally formed film sensor. The decorative film is adhered to the film sensor by performing the vacuum forming again. Accordingly, an integrally molded touch panel is obtained.

In the thermoforming method such as vacuum forming, the film sensor is made of a stretchable material in consideration of stretching in the forming (molding) process and the electrode is made of, e.g., a mixture of powdered silver having conductivity and a thermoplastic resin binder.

In that case, as shown in FIG. 10A, powdered silver adjacent to each other are brought into contact, thereby forming an electrode. However, after the stretching, the electrode is partially disconnected (see the right-hand side of FIG. 10A). This is because a mixture amount of the resin binder is limited to ensure the conductivity of the electrode and, thus, it is difficult for the electrode to have enough stretchability, which leads to the partial disconnection of the electrode.

FIG. 10B shows SEM (Scanning Electron Microscope) images of before and after the stretching in the case of forming a wiring on the base film by using an electrode material obtained by mixing powdered silver and a resin binder. FIG. 10B shows that the wiring is partially disconnected after the stretching.

SUMMARY OF THE INVENTION

In view of the above, the present disclosure provides a touch panel having a structure for preventing breakage/disconnection of an electrode in the case of three-dimensionally molding a film sensor including a base film and an electrode that have stretchability, and a manufacturing method thereof.

In accordance with an aspect of the present disclosure, there is provided a touch panel including a sensor unit, the sensor unit including: a base film stretched by heat; an electrode portion, which is made of a mixture of a conductive material and a thermoplastic resin and is formed on at least one surface of the base film; and a stretching supporting layer made of a thermoplastic resin to cover the electrode portion.

The touch panel described above may further include a shield layer made of a mixture of a conductive material and a thermoplastic resin and formed on a surface of the sensor unit, which is to be attached to a base portion, to cover the sensor unit in a grounded state, and an additional stretching supporting layer made of a thermoplastic resin and formed to cover the shield layer.

Further, the sensor unit may be three-dimensionally molded in a predetermined shape by heating.

Further, the three-dimensionally molded sensor unit may be adhered to the base portion through an adhesive layer.

In accordance with another aspect of the present disclosure, there is provided a touch panel manufacturing method including: forming an electrode portion made of a mixture of a conductive film and a thermoplastic resin on at least one surface of a base film that is stretched by heat; and forming a stretching supporting layer made of a thermoplastic resin to cover the electrode portion.

In accordance with the touch panel of the present disclosure, the stretching supporting layer made of the thermoplastic resin is formed to cover the surface of the electrode portion formed on the base film and, thus, the electrode portion is stretched as the base film and the stretching supporting layer are stretched during the three-dimensional molding. Therefore, a tensile force applied to the electrode portion becomes uniform and the stretchability can be improved compared to that of a conventional product. Accordingly, the wiring of the electrode portion can be prevented from being disconnected during the three-dimensional molding.

By forming the shield layer made of the stretchable conductive material on the surface of the sensor unit that is to be attached to the base portion, it is possible to prevent the malfunction of the electrode portion caused by the electromagnetic waves (noise) generated from electronic components installed inside the base portion.

Further, the electrostatic capacitances of the adjacent electrodes interfere with each other between the electrodes adjacent to each other near the edge portion of the three-dimensionally molded touch panel. This leads to a change in the voltages due to the short distance between the electrodes, and a malfunction of the sensor may occur. However, by forming the shield layer on the surface of the sensor unit that is to be attached to the base portion, the adverse effect from the interference of the electrostatic capacitances can be reduced and the malfunction of the sensor can be prevented.

BRIEF DESCRIPTION OF THE DRAWINGS

The objects and features of the disclosure will become apparent from the following description of embodiments, given in conjunction with the accompanying drawings, in which:

FIG. 2 schematically shows a stretching mechanism of an electrode portion in the touch panel;

FIG. 4A is a schematic cross sectional view of a mold that is a base portion for forming the touch panel; FIG. 4B is a schematic cross sectional view of the mold after a formation of a sensor unit on the mold in a vacuum forming process of the touch panel; and FIG. 4C is a schematic cross sectional view of the mold after a formation of the decorative film on the mold in the vacuum forming process of the touch panel;

DETAILED DESCRIPTION OF THE EMBODIMENTS

Hereinafter, embodiments of the present disclosure will be described in detail with reference to the accompanying drawings. The present disclosure is not limited to the following embodiments, and other embodiments, test examples, operation techniques and the like which are made by those skilled in the art based on the following embodiments are also included in the scope of the present disclosure.

1. Configuration of Touch Panel

First, a configuration of a touch panel 1 of the present disclosure will be described.

Figure 1A:
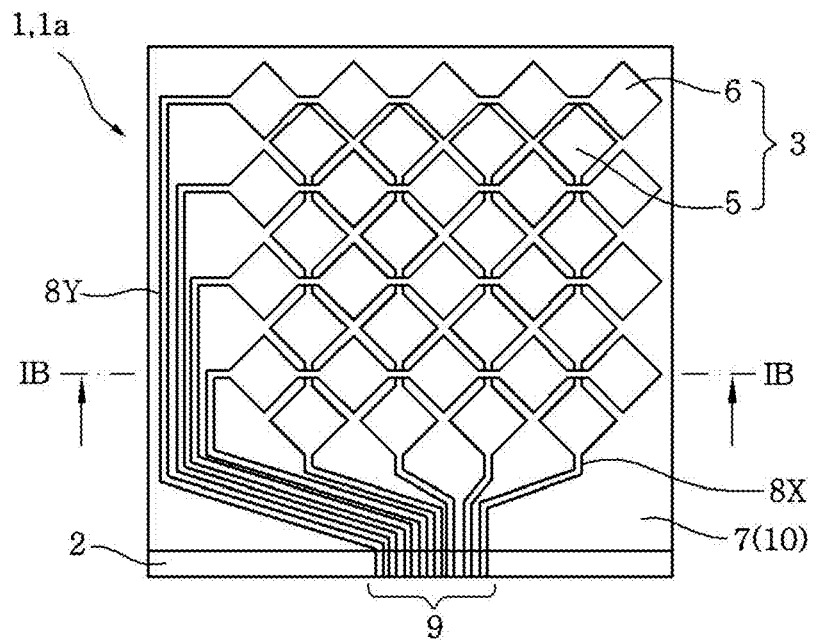
FIG. 1A is a top view schematically showing a touch panel.
Figure 1B:
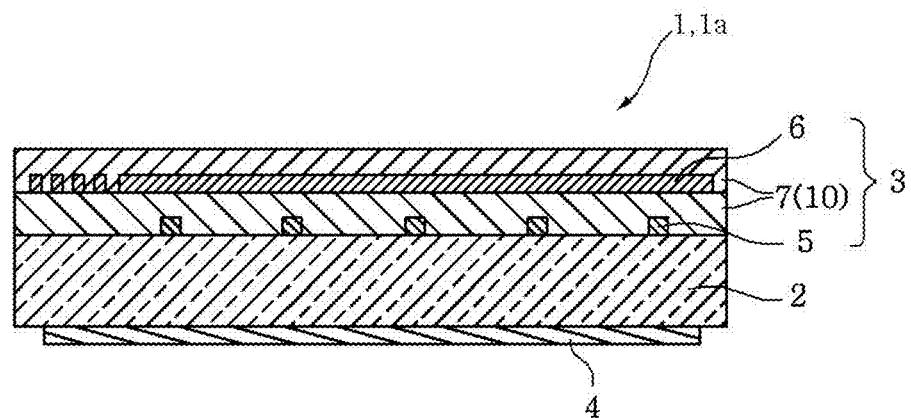
FIG. 1B is a schematic cross sectional view showing a layer structure (single-side structure) of the touch panel, which is taken along line IB-IB shown in FIG. 1A.

As shown in FIGS. 1A and 1B, the touch panel 1 of the present disclosure is three-dimensionally formed by attaching a film-shaped sensor unit 1a to a base portion 13 to be described later through an adhesive layer 4. The sensor unit 1a includes a base film 2 made of a thermoplastic resin material such as polycarbonate or the like that is stretched by heat; an electrode portion 3 formed on a top surface of the base film 2; and the adhesive layer 4, which is made of OCA and formed on a bottom surface of the base film 2.

As shown in FIG. 1B, the electrode portion 3 includes X electrodes 5 formed on a top surface of the base film 2, an insulating layer 7 covering the X electrodes 5, and Y electrodes 6 formed on a top surface of the insulating layer 7.

As shown in FIG. 1A, the X electrodes 5 and the Y electrodes 6 are arranged such that a plurality of electrode patterns having a diamond shape or a square shape when seen from the top are disposed in the X direction and Y direction. The electrode patterns are connected in a line-shaped pattern and combined in a nest shape with a fine gap therebetween when seen from the top. The matrix formed by the X electrodes 5 and the Y electrodes 6 covers the entire touch surface (manipulation surface) of the touch panel.

The insulating layer 7 insulates the electrode portion 3 formed on the base film 2. The material of the insulating layer 7 is not particularly limited as long as the electrode portion 3 is insulated and the product quality is not affected when the touch panel 1 is manufactured. The insulating layer 7 may be made of a thermoplastic resin material, e.g., polymethyl methacrylate (PMMA), polyethylene (PE), polypropylene (PP), polycarbonate (PC), polyester (PET), polyvinyl chloride (PVC), polystyrene (PS), or the like, which is the same material as that of a stretching supporting layer 10 to be described later.

Figure 1C:
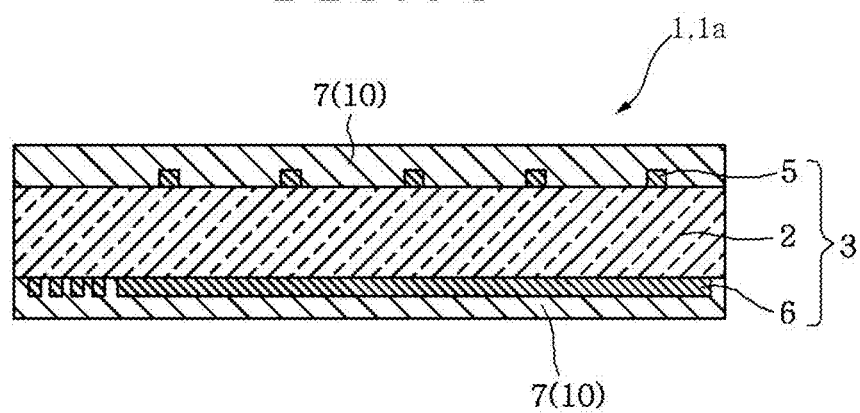
FIG. 1C is a schematic cross sectional view showing a layer structure (double-side structure) of the touch panel.

Therefore, when the stretching supporting layer 10 functions as the insulating layer 7, it is not required to form the insulating layer 7 because the stretching supporting layer 10 is made of a thermoplastic insulating material. As shown in FIGS. 1B and 1C, the present embodiment uses the stretching supporting layer 10 as the insulating layer 7.

Lead-out wirings 8X and 8Y of the X electrodes 5 and the Y electrodes 6 constitute leading portions 9 arranged at a predetermined interval at one edge of the base film 2. Therefore, as shown in FIG. 1B, the X electrodes 5 and the Y electrodes 6 are arranged at different positions in a thickness direction of the layer (the laminated direction of the layer that is in parallel with a vertical direction in FIG. 1B) with the stretching supporting layer 10 functioning as the insulating layer 7 interposed therebetween. Thus, the X electrodes 5 and the Y electrodes 6 are insulated from each other.

The X electrodes 5 and the Y electrodes 6 are made of an electrode material in which a conductive material that can be used for an electrode, such as copper, silver, carbon or the like, is mixed with a thermoplastic resin (e.g., acrylic resin). A weight ratio of the thermoplastic resin in the electrode material may be set to a level at which the electrode is stretched by a predetermined amount without disconnection of the molding pattern when heated during three-dimensional molding and at which the function of the electrode does not deteriorate. Although the weight ratio of the thermoplastic resin depends on the compatibility of a resin material and a conductive material to be used, it is preferably about 5 wt % to 40 wt % with respect to a total amount.

As shown in FIG. 1B, the stretching supporting layer 10 is formed on a surface (top surface in FIG. 1B) of the base film 2 in the sensor unit 1a to cover the electrode portion 3. The stretching supporting layer 10 is made of a thermoplastic resin, e.g., polymethyl methacrylate (PMMA), polyethylene (PE), polypropylene (PP), polycarbonate (PC), polyester (PET), polyvinyl chloride (PVC), polystyrene (PS), or the like. The stretching supporting layer 10 is softened and stretched by heating during three-dimensional molding.

The stretching supporting layer 10 is softened and stretched together with the base film 2 and the electrode portion 3 when heated during the three-dimensional molding. As shown in FIG. 2, the electrode portion 3 is embedded between the base film 2 and the stretching supporting layer 10. The electrode portion 3 is stretched as the base film 2 and the stretching supporting layer 10 are stretched. Since a tensile force applied to the electrode portion 3 becomes uniform, the electrode portion 3 can be stretched by a predetermined distance without being disconnected while maintaining a conducting state (electrically connected state) in which particles of the conductive material forming the electrodes in the electrode portion 3 are brought into contact with each other.

Figure 3A:
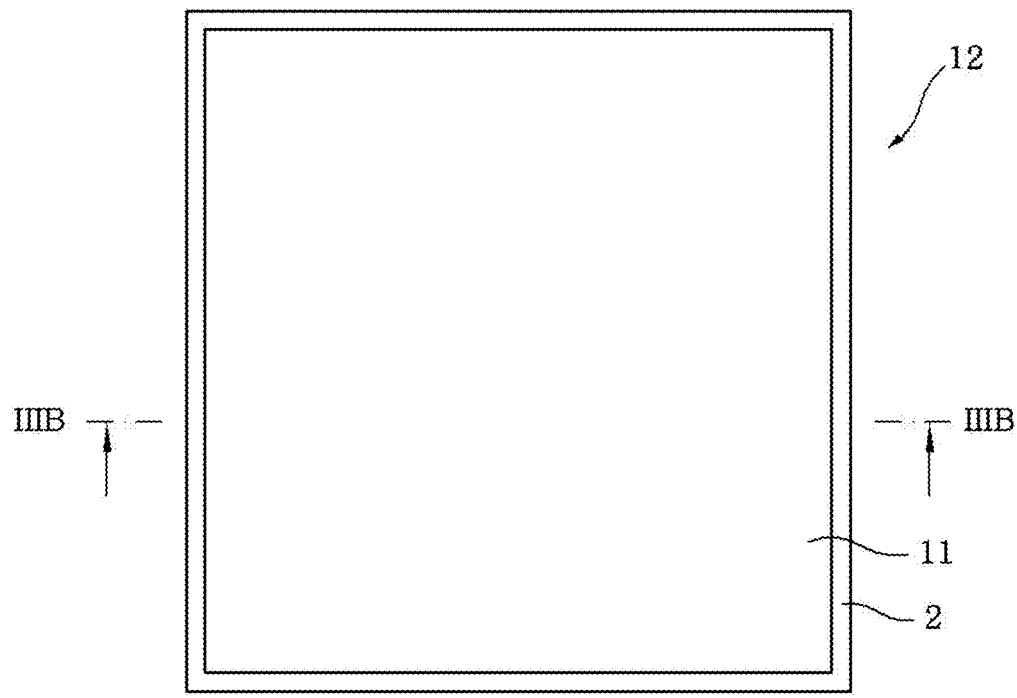
FIG. 3A is a top view schematically showing a decorative film as a decorative layer forming a part of the touch panel and FIG. 3B is a schematic cross sectional view of the decorative film which is taken along line IIIB-IIIB shown in FIG. 3A.
Figure 3B:
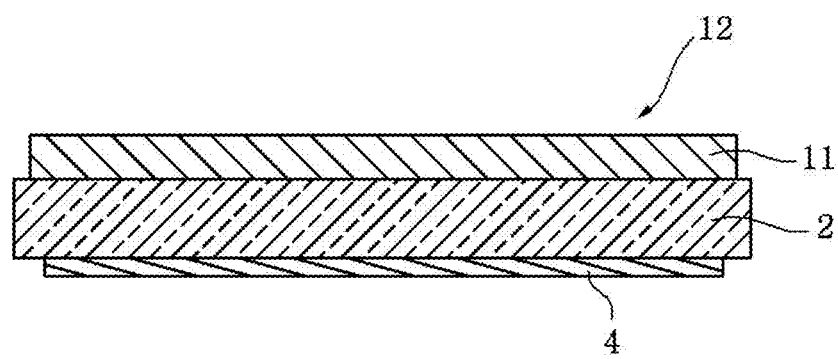

As shown in FIGS. 3A and 3B, a decorative unit (decorative film) 12 provided in the touch panel 1 includes a decorative layer 11, a base film 2' and an adhesive layer 4'. In order to increase designability, the decorative unit 12 may be attached, through the adhesive layer 4', on the surface of the stretching supporting layer 10 in the touch panel 1 after three-dimensional molding through the adhesive layer 4, if necessary. Depending on purposes of the touch panel and required aesthetic properties, the decorative layer 11 of the decorative unit 12 may have specific colors, transparency or non-transparency, or specific patterns.

The followings are examples of specific dimensions in the above configuration example. The base film 2 has a thickness of about 0.3 mm. Each of the X electrodes 5 and the Y electrodes 6 of the electrode portion 3 has a thickness of about 5 μm to 10 μm. The insulating layer 7 has a thickness of about 20 μm to 30 μm. The adhesive layer 4 made of OCA has a thickness of about 50 μm. The stretching supporting layer 10 has a thickness of about 20 μm to 30 μm.

In FIG. 1B, the sensor unit 1a has a single-side structure in which the electrode portion 3 and the stretching supporting layer 10 are formed on one surface (top surface in FIG. 1B) of the base film 2. However, as shown in FIG. 1C, the sensor unit 1a may employ a double-side structure in which the X electrodes 5 are formed on one side (top surface in FIG. 1C) of the base film 2; the stretching supporting layer 10 is formed to cover the top surface; the Y electrodes 6 are formed on the other surface (bottom surface in FIG. 1C); and the stretching supporting layer 10 is also formed to cover the bottom surface.

In the case of employing the double-side structure, the X electrodes 5 or the Y electrodes 6 are disposed between the base film 2 and the stretching supporting layer 10 and, thus, the electrodes can be uniformly stretched as the base film 2 and the stretching supporting layer 10 are stretched, as in the case of employing the single-side structure.

2. Manufacturing Method of Touch Panel

Next, a manufacturing method of the touch panel 1 will be described. The manufacturing method of the touch panel 1 of the present disclosure will be briefly described and, then, embodiments (first embodiment and second embodiment) of the manufacturing method will be described in detail.

2-1. Outline of Manufacturing Method

First, the manufacturing method of the touch panel 1 of the present disclosure will be schematically described with reference to FIGS. 4A to 4C.

The touch panel 1 of the present embodiment is three-dimensionally molded by thermoforming. In order to maintain the three-dimensional shape of the touch panel 1, the touch panel 1 includes a base portion 13 that is a mold for molding a film-shaped sensor unit 1a in a predetermined shape and is also a target to which the film-shaped sensor unit 1a is attached.

When the base portion 13 is a part of a sphere greater than a hemisphere as can be seen from FIG. 4A, the base portion 13 needs to be pressed against the sensor unit 1a to bring the sensor unit 1a covering the base portion 13 into close contact with the entire curved surface of the base portion 13. In that case, however, the sensor unit 1a may not be in close contact with a part of the curved surface of the base portion 13 positioned near a flat bottom surface of the base portion 13. However, the molding can be efficiently performed along the curved surface of the mold by heating and pressing.

As shown in FIG. 4A, the base portion 13 of the present embodiment has a generally hemispherical shape but is greater than a hemisphere, which is obtained by cutting a sphere two-dimensionally at an off-center position. As shown in FIG. 4B, the film-shaped sensor unit 1a is softened and stably stretched by heating through a vacuum forming method to be described later, and the sensor unit 1a is relatively pressed against the base portion 13 so that the sensor unit 1a is attached to the curved surface of the base portion 13 through the adhesive layer 4.

As shown in FIG. 4C, the film-shaped decorative unit is provided to cover the sensor unit 1a and then is softened and stretched by heating. In this state, the decorative unit 12 is relatively pressed against the base portion 13 and attached onto the sensor unit 1a by, e.g., vacuum forming. The decorative unit 12 is molded along the curved surface of the base portion 12 and adhered to the sensor unit 1a by the adhesive layer 4 covering the sensor unit 1a. The electrode portion 3 shown in FIGS. 4A to 4C is illustrated differently from the electrode portion 3 shown in FIG. 1B for the sake of simple illustration. Further, the electrode portion 3 is illustrated to have a single-layer structure in FIGS. 4A to 4C.

Therefore, the obtained touch panel 1 is a three-dimensional product in which the sensor unit 1a is attached to the generally hemispherical surface of the base portion 13 and the decorative unit 12 is attached to the surface of the sensor unit 1a to obtain a predetermined design. The three-dimensional touch panel 1 may be used to deal with a generally hemispherical shape or size of the base portion 13 and further may be used for various purposes appropriate to the design of the decorative unit 12. For example, the generally hemispherical touch panel 1 may be installed at a console of a vehicle and allow a driver to manipulate devices for driving by finger touch.

2-2. First Embodiment (Configuration of Molding Apparatus of First Embodiment)

Next, a molding apparatus 20 used in the manufacturing method of the touch panel 1 of the first embodiment will be described.

Figure 5A:
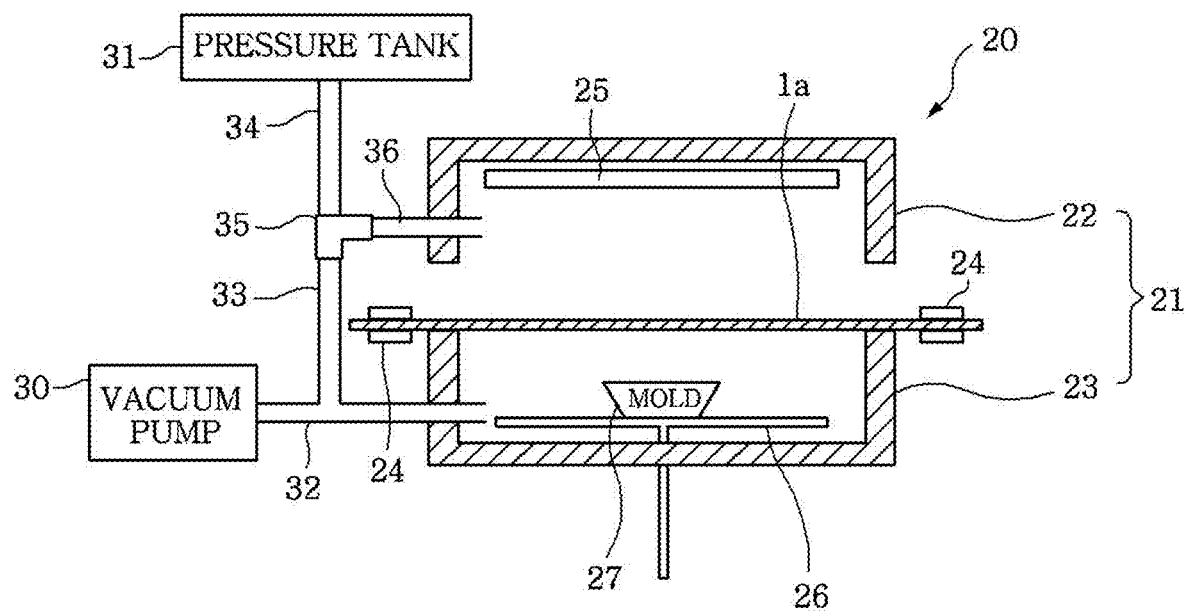
FIGS. 5A to 5C show a manufacturing process of a touch panel according to a first embodiment.

In the manufacturing method of the first embodiment, the touch panel 1 is molded by vacuum forming, which is one of the molding methods. As shown in FIG. 5A, the molding apparatus 20 includes a vacuum chamber 21. The vacuum chamber 21 is a cuboid case and divided by a horizontal plane passing through the center in a height (vertical) direction into an upper case 22 and a lower case 23. The upper case 22 and the lower case 23 have substantially the same shape. The upper case 22 and the lower case 23 can be relatively moved in a vertical direction, if necessary, by a driving and moving guide unit (not shown).

In the present embodiment, the lower case 23 is fixed to a predetermined position, and the upper case 22 can be relatively moved in the vertical direction with respect to the lower case 23 by the driving and moving guide unit (not shown). By relatively moving the upper case 22 in the vertical direction with respect to the lower case 23, the vacuum chamber 21 can be opened and closed. When the upper case 22 and the lower case 23 are in a closed state, the inside of the vacuum chamber 21 is airtightly sealed from the outside.

At the outside of the vacuum chamber 21, holding units for holding the film-shaped sensor unit 1a therebetween are provided at opposite two locations on a straight line extending along the horizontal plane for dividing the upper case 22 and the lower case 23. The sensor unit 1a held by the holding units 24 is positioned between the upper case 22 and the lower case 23 in an open state of the vacuum chamber 21. Then, the upper case 22 is moved to make the vacuum chamber 21 be in a closed state, so that the sensor unit 1a can be located at a substantially central portion of the airtightly sealed vacuum chamber 21.

A heating unit 25 is provided on an inner top surface of the upper case 22 of the vacuum chamber 21. The heating unit 25 includes an infrared ray heater capable of heating the sensor unit 1a even in a vacuum state. The heating unit 25 heats the sensor unit 1a by irradiating infrared rays to the top surface of the sensor unit 1a held by the holding units 24. An elevation unit 26 is disposed on a bottom surface of the lower case 23 of the vacuum chamber 21. A mold 27 corresponding to the base portion 13 of the touch panel 1 is disposed on the elevation unit 26. The mold 27 can be moved up from a standby position to a molding position at the time required in the molding process. The elevation unit 26 can push up the sensor unit 1a held by the holding units 24 from below the sensor unit 1a by using the mold installed at the elevation unit 26.

At the outside of the vacuum chamber 21, a vacuum pump is provided as a unit for generating vacuum atmosphere (or depressurized atmosphere) by sucking air out of the vacuum chamber 21. In addition, at the outside of the vacuum chamber 21, a pressure tank 31 is provided as a unit for generating atmospheric atmosphere (or pressurized atmosphere higher than the atmospheric atmosphere) by supplying air into the vacuum chamber 21. An air inlet of the vacuum pump 30 is connected to and communicates with the inside of the lower case 23 through a first conduit 32, so that the air in the lower case 23 can be sucked out.

A branch line 33 is branched from the first conduit 32. The branch line 33 and a supply line 34 connected to a supply port of the pressure tank 31 are coaxially connected at a switching unit 35. A second conduit 36 is connected to and communicates with the inside of the upper case 22. The second conduit 36 is connected to the switching unit 35. Therefore, by switching the switching unit 35 upward or downward, it is possible to selectively perform an operation of sucking the air out from the inside of the upper case 22 by connecting the vacuum pump 30 and the switching unit 35 and an operation of supplying air into the upper case 22 by connecting the pressure tank 31 and the switching unit 35.

(Manufacturing Process of the First Embodiment)

Next, a manufacturing process of the touch panel 1 according to the first embodiment will be described sequentially.

As shown in FIG. 5A, the vacuum chamber 21 is opened, and the sensor unit 1a held by the holding units 24 is positioned on the dividing plane of the upper case 22 and the lower case 23. At this time, the sensor unit 1a is positioned such that the stretching supporting layer 10 faces the heating unit 25 and the adhesive layer 4 faces the mold.

Figure 5B:
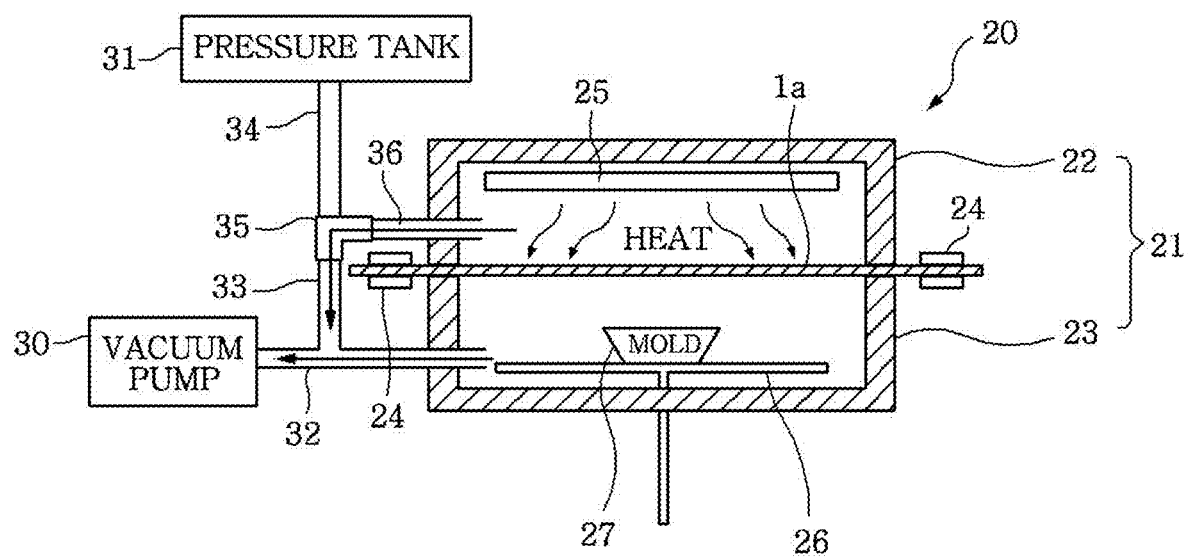

As shown in FIG. 5B, the vacuum chamber 21 is closed. The switching unit 35 is switched downward to allow the second conduit 36 to communicate with the branch line 33 communicating with the vacuum pump 30, and the vacuum pump 30 is operated. The vacuum pump 30 sucks the air out from the inside of the lower case 23 through the first conduit 32 and also sucks the air out from the inside of the upper case 22 through the second conduit 36. When the inside of the vacuum chamber 21 becomes a desire vacuum state, the heating unit 25 is operated to heat the sensor unit 1a. Here, the heating is performed by infrared rays and, thus, the sensor unit 1a can be heated even in a vacuum state.

Figure 5C:
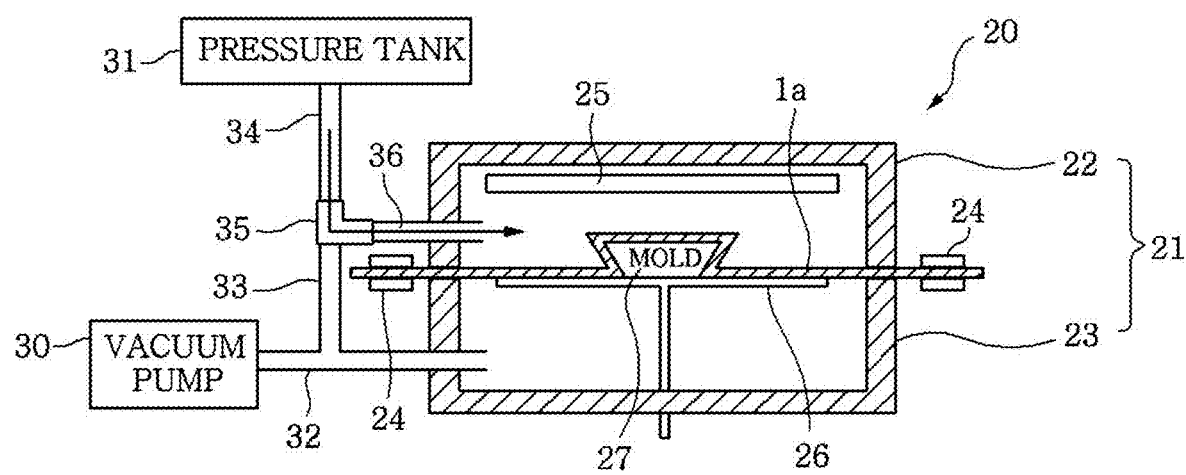

Further, as shown in FIG. 5C, while the heating is continued, the elevation unit 26 is moved up and the sensor unit 1a is pushed up by the mold 27. Further, the switching unit 35 is switched upward to allow the second conduit 36 to communicate with the supply line 34 communicating with the pressure tank 31 and air is supplied from the pressure tank 31 into the upper case 22. At this time, the sensor unit 1a is uniformly heated, and the entire sensor unit 1a has stable stretchability. A portion of the sensor unit 1a, which corresponds to the mold 27, is pushed up from the bottom by the mold 27 and, at the same time, the portion of the sensor unit 1a is pressed down from the top against the mold 27 due to a pressure difference between the depressurized state in the lower case 23 and the atmospheric or pressurized state in the upper case 22 by the supply of the air into the upper case 22. Accordingly, the film-shaped sensor unit 1a is stably stretched without breakage or the like, attached to the surface of the mold 27, and molded in a shape corresponding to the three-dimensional shape of the mold 27.

In FIGS. 5A to 5C, an upside-down truncated cone-shaped mold 27 is employed as the base portion 13, unlike the example shown in FIGS. 4A to 4C. However, the shape of the base portion or the mold serving as a core of the three-dimensional touch panel is not limited. Any other shapes for the base portion and the mold may be employed, if necessary.

As shown in FIGS. 5A to 5C, a manipulation region of the touch panel 1 is formed on the larger one of two parallel circular surfaces of the upside-down truncated cone-shaped mold 27 and a side surface connecting the circumferences of the two parallel circular surfaces. In other words, the manipulation region of the sensor unit 1a shown in FIGS. 5A to 5C has a three-dimensional shape different from the example shown in FIGS. 4A to 4C, by attaching the sensor unit 1a to one of the two parallel circular surfaces and the side surface by stretching the sheet-shaped sensor unit 1a by means of the mold 27 and disposing the electrode portion 3 of the sensor unit 1a at one circular surface and the side surface that eventually serve as the manipulation region.

After the completion of the molding process shown in FIG. 5C, a portion of the sheet-shaped sensor unit 1a that is not attached to the mold 27 is cut in a circular shape at a position away from the smaller one of the two parallel circular surfaces to surround the smaller circular surface, and a cut-off portion from the mold 27 is discarded. In other words, a part of the portion of the sheet-shaped sensor unit 1a that is not attached to the mold 27 remains as a collar-shaped portion connected to the portion attached to the mold 27. In the case of employing a structure in which the touch sensor is attached as one unit to a predetermined position of another device at the collar-shaped portion of the sensor unit 1a, the assemble and the structural integrity of the device are improved and, also, the aesthetic properties of the connecting portion between the touch sensor and another device is improved. As a result, the overall appearance is improved.

Although it is not illustrated, after the sensor unit 1a is attached to the surface of the mold 27, an outer peripheral portion of the film-shaped sensor unit 1a that is not attached to the mold 27 is cut and discarded, and the mold 27 to which the sensor unit 1a is attached is positioned on the elevation unit 26. Then, the decorative unit 12 is held by the holding units 24 such that the decorative layer 11 faces the heating unit 25, and the steps shown in FIGS. 5A to 5C are repeated.

As a result, the decorative unit 12 is attached in a stacked manner to the surface of the sensor unit 1a attached to the mold 27. After the decorative unit 12 is attached to the sensor unit 1a, an outer peripheral portion of the decorative unit 12 that is not attached to the mold 27 and the sensor unit 1a is cut and discarded. Accordingly, the touch panel 1 having the three-dimensional shape of the mold 27 is obtained.

In the above-described steps, the vacuum forming of the sensor unit 1a and the vacuum forming of the decorative unit 12 are separately performed. However, the touch panel 1 may be manufactured by performing a single vacuum forming process in a state where the decorative unit 12 is stacked on the sensor unit 1a.

2-3. Second Embodiment (Configuration of Molding Apparatus of Second Embodiment)

Next, a manufacturing method of a touch panel 1 according to a second embodiment will be described.

Figure 6A:
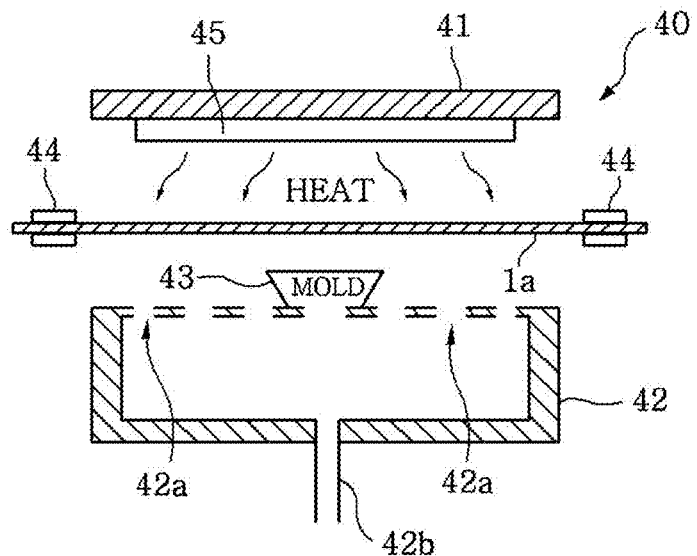
FIGS. 6A to 6C show a manufacturing process of a touch panel according to a second embodiment.
Figure 6B:
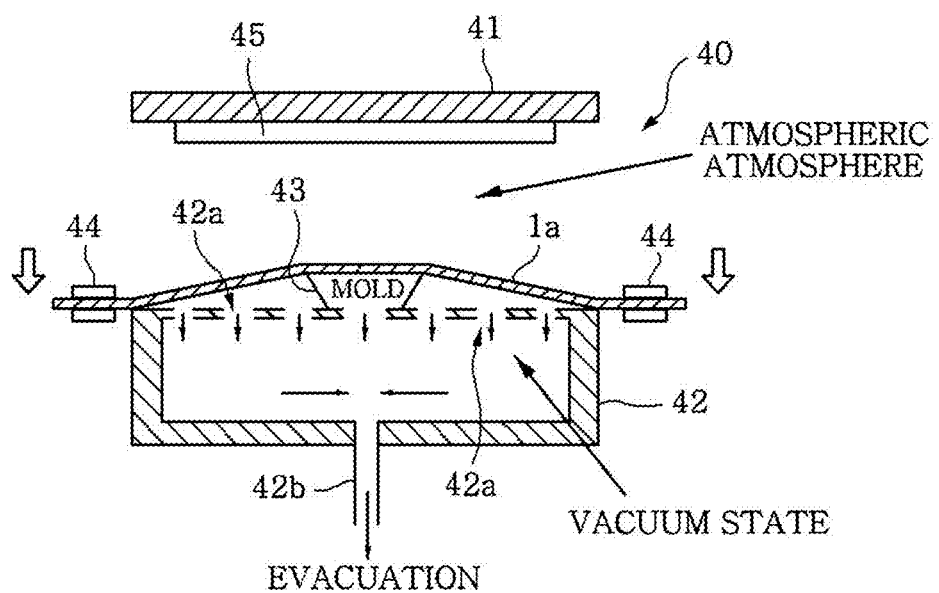
Figure 6C:
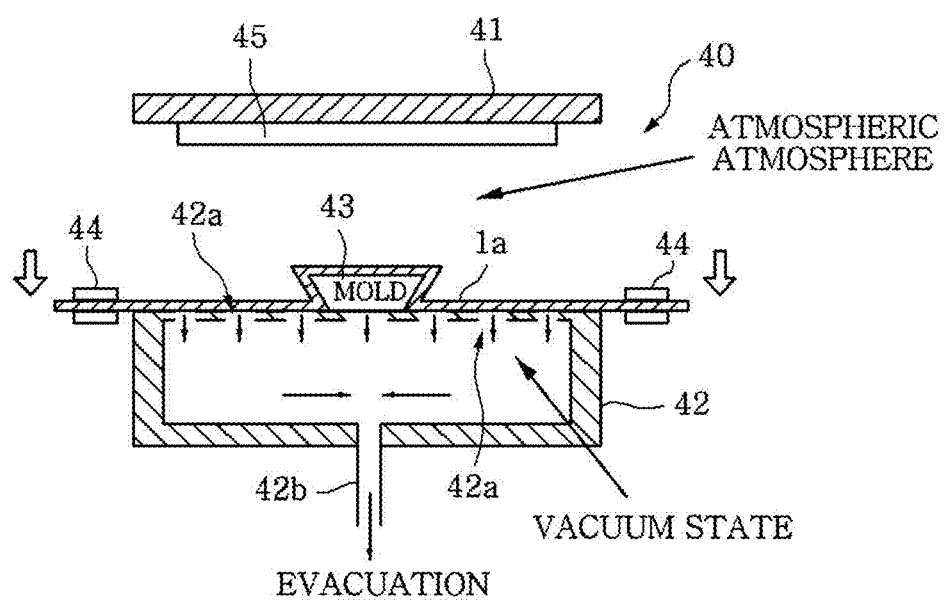

As shown in FIGS. 6A to 6C, a molding apparatus 40 according to the second embodiment includes: a case 41 that is a plate-shaped member; a vacuum generating unit 42 provided below the case 41 in which a mold 43 serving as the base portion 13 is provided substantially at a center thereof; and holding units 44 for pressing down the sensor unit 1a against the mold 43 by using a driving and moving unit (not shown).

A heating unit 45 for heating the sensor unit 1a is provided at the case 41. In the first embodiment, the infrared ray heater is used to heat the sensor unit 1a in a vacuum state. However, in the second embodiment, the heating is performed in an atmospheric atmosphere. Therefore, the heating unit 45 is not limited to the infrared ray heater and may be any heating device, e.g. a heating wire heater or the like, that can heat the sensor unit 1a. Accordingly, in the second embodiment, a wider variety of molding apparatuses 40 can be employed compared to that in the first embodiment.

The vacuum generating unit 42 has a plurality of suction holes 42a on a surface where the mold 43 is disposed. When air is sucked out from a suction path 42b after the sensor unit 1a is moved to a molding position by the holding units 44, vacuum suction is performed through the suction holes 42a disposed below the bottom surface of the sensor unit 1a. Accordingly, the sensor unit 1a is attached to the base portion 13 by using a pressure difference between the top surface and the bottom surface of the sensor unit 1a.

(Manufacturing Process of the Second Embodiment)

Next, a manufacturing process of the touch panel 1 according to the second embodiment will be described sequentially.

As shown in FIG. 6A, the sensor unit 1a is heated by the heating unit 45 in a state where the sensor unit 1a is held by the holding units 44 such that the stretching supporting layer 10 faces the heating unit 45 and the adhesive layer 4 faces the mold 43. The heating is performed in an atmospheric atmosphere.

Next, as shown in FIG. 6B, the holding units 44 are moved down to a predetermined molding position. Then, as shown in FIG. 6C, the sensor unit 1a that is uniformly heated and has stable stretchability is pressed down against the mold 43, and the suction is started by operating the vacuum generating apparatus 42. At this time, the top surface of the sensor unit 1a (stretching supporting layer side) lies in an atmospheric state, and the bottom surface of the sensor unit 1a (adhesive layer 4 side) which faces the vacuum generating unit 32 lies in a depressurized state. Due to the pressure difference, the sensor unit 1a is pressed against the mold 43 from the top. Therefore, the film-shaped sensor unit 1a is attached to the surface of the mold 43 while being stably stretched without breakage or the like and molded in a shape corresponding to the three-dimensional shape of the mold 43.

In FIGS. 6A to 6C, an upside-down truncated cone-shaped mold 43 is employed as the base portion 13, unlike the example shown in FIGS. 4A to 4C. However, as in the first embodiment, the shape of the base portion or the mold serving as a core of a three-dimensional touch panel is not limited, and any other shapes may be employed for the base portion and the mold, if necessary.

Although not illustrated, as in the first embodiment, after the sensor unit 1a is attached to the surface of the mold 43, an outer peripheral portion of the film-shaped sensor unit 1a that is not attached to the mold 43 is cut and discarded, and the mold 43 to which the sensor unit 1a is attached is positioned in the vacuum generating unit 42. Then, the decorative unit 12 is held by the holding units 44 such that the decorative layer 11 faces the heating unit 45, and the steps shown in FIGS. 6A to 6C are repeated.

As a consequence, the decorative unit 12 is attached in a stacked manner to the surface of the sensor unit 1a attached to the mold 43. After the decorative unit 12 is attached to the sensor unit 1a, the outer peripheral portion of the decorative unit 12 that is not attached to the mold 43 and the sensor unit 1a is cut and discarded. As a result, the touch panel 1 having the three-dimensional shape of the mold 43 is obtained.

3. Test Example

Next, the result of a comparison between the above-described touch panel 1 and the conventional touch panel will be described.

The conditions to be described in the following test example are merely examples and may be appropriately changed without departing from the scope of the present disclosure depending on the specifications of the touch panel 1 to be manufactured.

(Test condition)

For an electrode material of the present disclosure, a material in which powdered silver and thermoplastic resin (PMMA) are mixed at a weight ratio of 60:40 (wt %) was used.

For the base film 2, a polycarbonate (PC) film having a thickness of about 0.3 mm was used.

The same manufacturing process as that described in the second embodiment was performed, and the three-dimensional molding was performed after the sensor unit 1a was heated to about 160° C. by the heating unit 45.

For the conventional touch panel as a comparison target, a panel having no stretching supporting layer 10 was manufactured. The electrode wiring portions of both touch panels were compared by capturing the images of the cross sections thereof by SEM (Scanning Electron Microscope).

Figure 7:
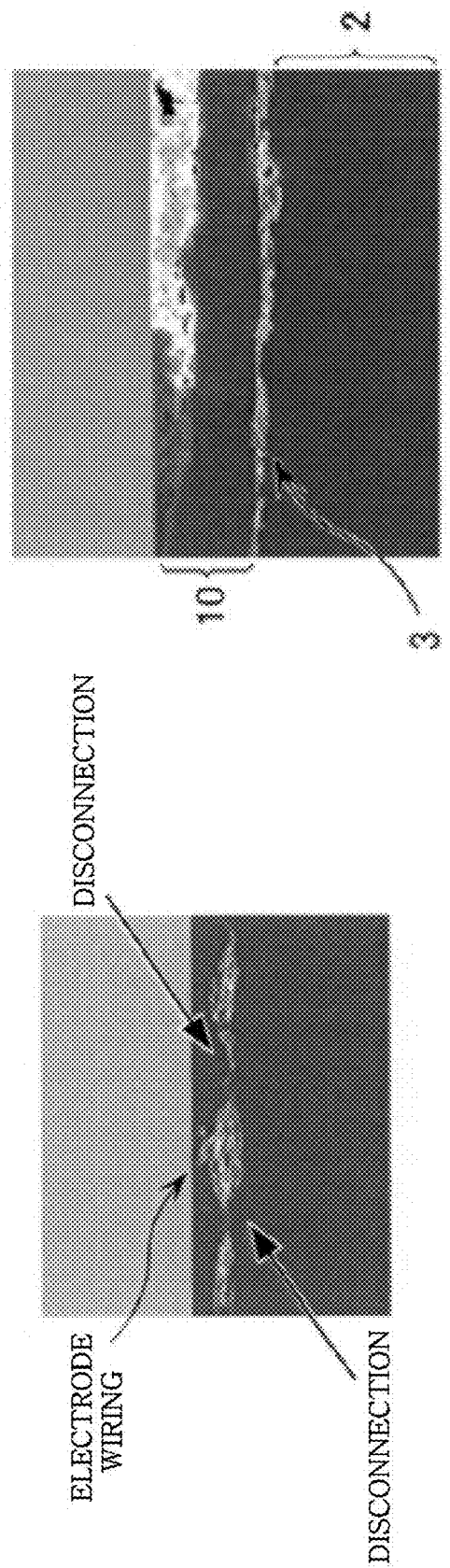
FIG. 7 shows partially enlarged images for comparing an electrode portion after three-dimensional molding of a conventional touch panel and an electrode portion after three-dimensional molding of a touch panel of the present disclosure.

FIG. 7 shows the test result where, in the conventional touch panel in which the stretching supporting layer 10 is not formed, the electrode portion is disconnected at multiple locations due to the tensile force of the stretching during the three-dimensional molding. However, in the touch panel 1 of the present disclosure in which the electrode portion 3 is interposed between the base film 2 and the stretching supporting layer 10, the electrode portion 3 is stretched without being disconnected. From the above, it is clear that the touch panel 1 of the present disclosure has an improved stretchability of the electrode portion 3 compared to that of the conventional touch panel.

As described above, in the touch panel 1, the electrode portion 3 made of a mixture of a conductive material and a thermoplastic resin is formed on the base film 2, and the stretching supporting layer 10 made of a thermoplastic resin covers the surface of the electrode portion 3.

Therefore, the electrode portion 3 is stretched as the base film 2 and the stretching supporting layer 10 are stretched. Accordingly, the tensile force applied to the electrode portion becomes uniform and the three-dimensional molding in a predetermined shape can be performed without the disconnection of the electrode portion 3.

Further, it is preferable that the thermoplastic resins included in the base film 2, the stretching supporting layer 10 and the electrode portion 3 are heated during the three-dimensional molding. Therefore, as described in the manufacturing methods of the first and the second embodiment, various devices such as an infrared ray heater, a heating wire heater and the like may be used as the heating units 25 and 45 to increase the selectivity of the manufacturing process.

Other Embodiments

The present disclosure is not limited to the above-described embodiments and may be variously modified without departing from the scope of the present disclosure as described below.

As described above, the touch panel 1 of the present disclosure has a configuration applicable to a touch type device provided at, e.g., a center console of a vehicle or the like. That is, the touch panel 1 is configured such that the film-shaped sensor unit 1a is attached to the surface of the base portion 13 formed in a shape corresponding to the shape of the device.

Figure 8:
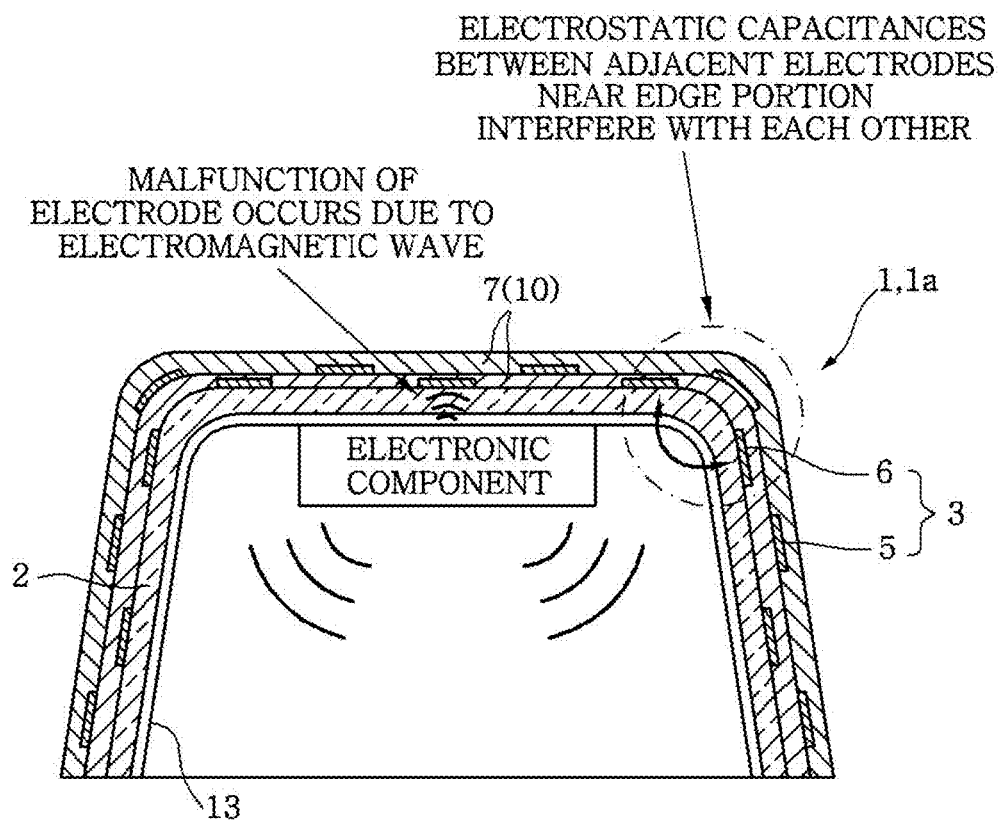
FIG. 8 shows an example in which electronic components are installed inside a base portion of a touch panel having edge portions.

Inside the base portion 13 to which the sensor unit 1a is attached, electronic components that allow the device to serve as a touch device are installed, as shown in FIG. 8. However, the electronic components become sources of noise, and electromagnetic waves radiated from the electronic components inflict adverse effects on the electrode portion 3 formed near the electronic components. This causes a malfunction of the sensor unit.

Further, when the three-dimensional molding is performed by stretching the touch panel 1 as described in the present disclosure, edge portions different from flat portions (flat surface) and smooth curved portions (curved surface) may be formed depending on the shape of the base portion 13, as shown in FIG. 8.

However, as shown in FIG. 8, the distances between the X electrodes 5 and the Y electrodes 6 provided near the edge portion are shorter than the distance between the X electrodes 5 and the Y electrodes 6 provided at the flat portion or the like and, thus, the electrostatic capacitances between the electrodes near the edge portion interfere with each other. Accordingly, the voltage is changed, which causes the malfunction of the sensor.

Figure 9A:
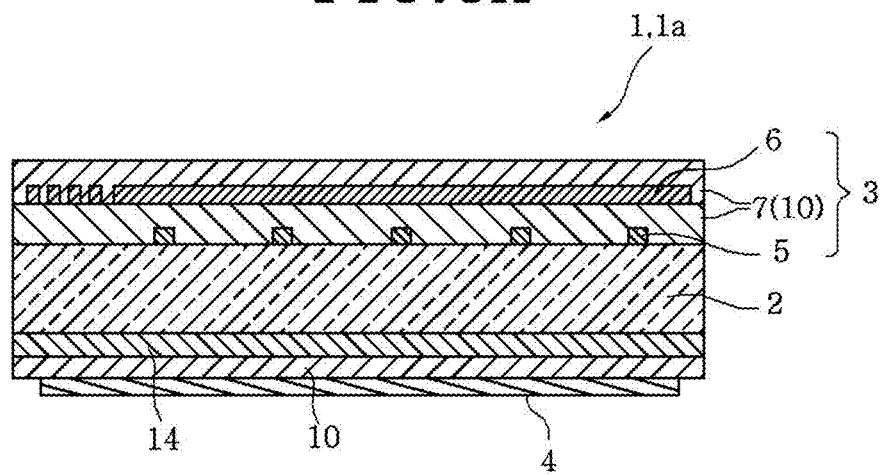
FIGS. 9A to 9C schematically show other examples of the touch panel of the present disclosure.
Figure 9B:
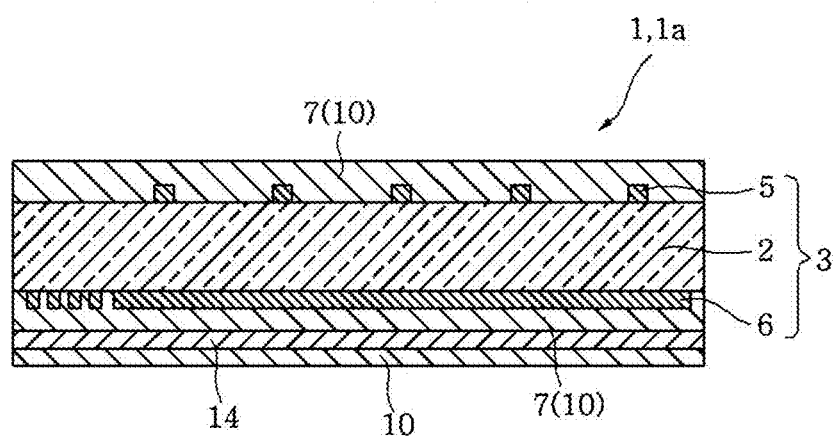

FIGS. 9A and 9B show a touch panel 1 according to another embodiment of the present disclosure. In this embodiment, a shield layer 14 is formed on the surface of the sensor unit 1a to be attached to the base portion 13 in order to prevent the malfunction of the sensor unit that is caused by the interference of the electrostatic capacitances between the adjacent electrodes (X electrodes 5 and Y electrodes 6) near the edge portion and the noise (electromagnetic wave) generated from the electronic components.

FIG. 9A shows a layer structure of the sensor unit 1a, which is the same as that shown in FIG. 1B, i.e., a single-side structure in which the electrode portion 3 and the stretching supporting layer 10 are formed on one surface of the base film 2 (top surface in FIG. 9A).

FIG. 9B shows a layer structure of the sensor unit 1a, which is the same as that shown in FIG. 1C, i.e., a double-side structure in which the X electrodes 5 are formed on one surface of the base film 2 (top surface in FIG. 9B); the stretching supporting layer 10 is formed to cover the top surface; the Y electrodes 6 are formed on the other surface of the base film 2 (bottom surface in FIG. 9B); and the stretching supporting layer 10 is also formed to cover the bottom surface.

The shield layer 14 is made of a material having conductivity and stretchability (stretchable conductive material). The stretchable conductive material is a mixture of a conductive material (e.g., copper, silver, carbon or the like), which can be used for the electrode portion 3 described above, and a thermoplastic resin (e.g., acrylic-based resin).

A part of the shield layer 14 is grounded to allow the electromagnetic wave radiated from the electronic components to flow through the shield layer 14 and reduce the adverse effect of noise caused by the electromagnetic wave from the electronic components. Further, since the shield layer 14 is grounded, it is possible to prevent the interference caused by electric fields between the adjacent electrodes near the edge portion.

As in the case of the X electrodes 5 and the Y electrodes 6, the shield layer 14 preferably has a thickness of about 5 µm to 10 µm in order to reduce the adverse effect of electromagnetic waves radiated from the electronic components or the like. Further, as in the case of the X electrodes 5 and the Y electrodes 6, the weight ratio of the thermoplastic resin in the shield layer 14 is preferably about 5 wt % to 40 wt % with respect to a total amount of the stretchable conductive material in order to ensure the stretchability during the three-dimensional molding.

Another stretching supporting layer 10 is formed on a surface of the shield layer 14 (i.e., between the shield layer 14 and the base portion 13). Since the shield layer 14 is made of the stretchable conductive material that is a mixture of the thermoplastic resin and the conductive material, as in the case of the X electrodes 5 and the Y electrodes 6, the stretching supporting layer 10 is additionally formed to maintain the electrically connected state between particles in the stretchable conductive material while preventing the disconnection of the stretchable conductive material that may occur locally by the stretching.

The touch panel in which the shield layer 14 and the stretching supporting layer 10 are additionally formed can be manufactured by the manufacturing process of the first embodiment or the second embodiment, which is described in "2. Manufacturing method of touch panel". Accordingly, as can be seen from FIG. 9C, for example, a touch type device in which the shield layer 14 is formed between the sensor unit 1a and the base portion 13 (i.e., on the surface of the base portion 13) is obtained.

Further, the shield layer 14 may cover at least the portions of the electronic components and the edge portions when attached to the base portion 13 by vacuum forming or the like because the shield layer 14 reduces the interference of the electrostatic capacitances between the adjacent electrodes near the edge portion and the noise of the electric components installed inside the base portion 13.

Figure 9C:
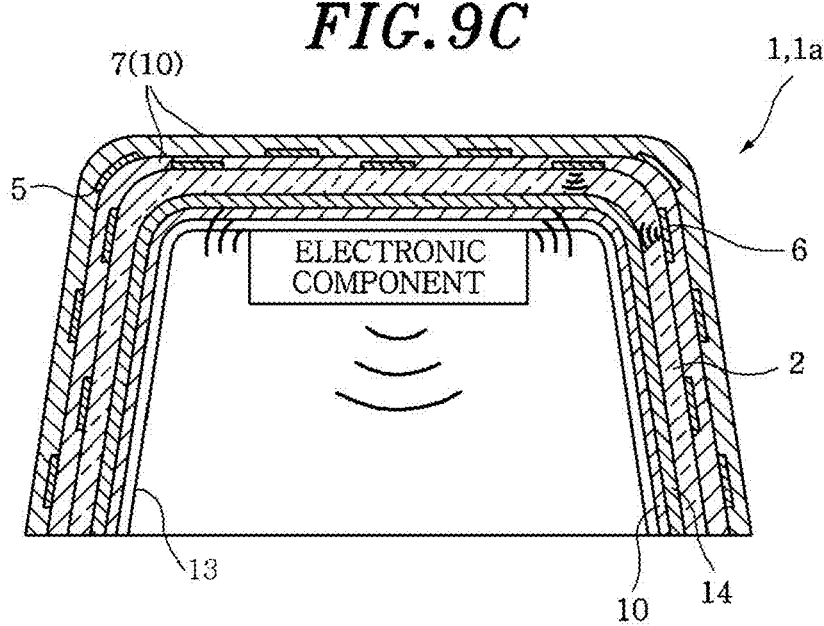
Figure 10A:
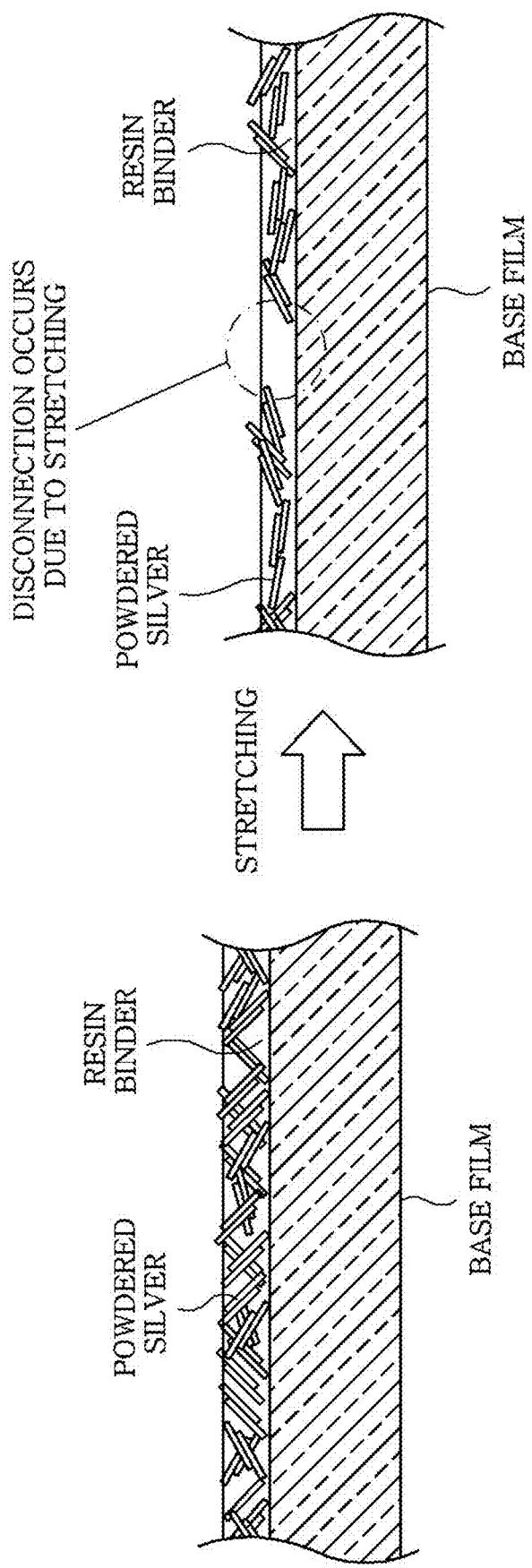
FIG. 10A schematically shows an electrode portion before and after three-dimensional molding in the conventional touch panel and FIG. 10B shows partially enlarged images of the electrode portion before and after the three-dimensional molding in the conventional touch panel.
Figure 10B:
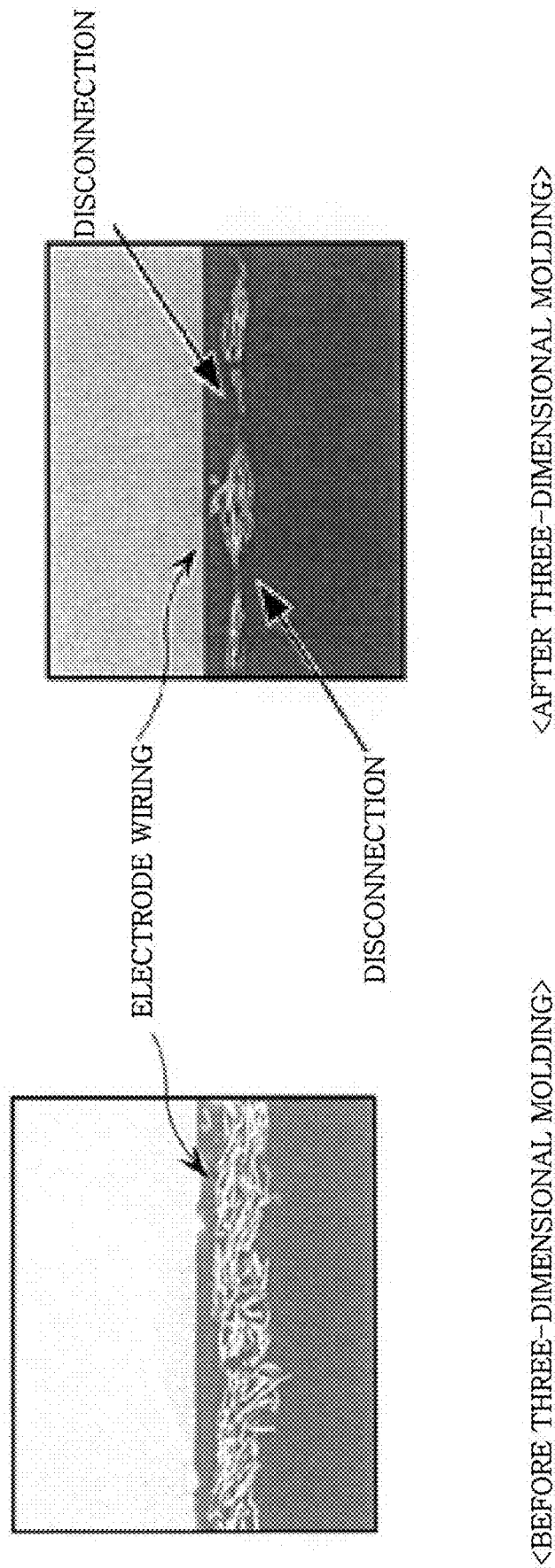

However, in order to minimize the adverse effects of the electromagnetic waves radiated from the electronic components and the interference of the electrostatic capacitances between the adjacent electrodes near the edge portion, it is preferable to form the shield layer 14 on the entire surface of the sensor unit 1a to be attached to the base portion 13 (i.e., the entire surface of the base portion 13), as can be seen from FIG. 9C. Accordingly, it is possible to further reduce the adverse effects of the electromagnetic waves (electromagnetic field) radiated generally in a spherical shape from the X electrodes 5 (or the Y electrodes 6) adjacent to each other near the edge portion and the electronic components.

As described above, in the touch panel 1 according to the present embodiment, the shield layer 14 made of the stretchable conductive material in which the conductive material and the thermoplastic resin are mixed is formed on the surface of the sensor unit 1a to be attached to the base portion 13. Further, the stretching supporting layer 10 is additionally formed on the surface of the shield layer 14. Therefore, it is possible to prevent the malfunction caused during the three-dimensional molding by the adverse effects of electromagnetic wave generated from the electronic components installed inside the base portion 13.

Accordingly, it is possible to provide a high-quality touch panel 1 capable of reducing the adverse effects of the electromagnetic waves (noise) radiated from the electronic components installed inside the base portion 13 and preventing the malfunction of the electrode portion 3.

The X electrodes 5 or the Y electrodes 6 adjacent to each other near the edge portion generated in the case of forming a three-dimensional touch panel 1 may cause the malfunction of the sensor due to changes in the voltage caused by the interference of the electrostatic capacitances between the X electrodes 5 or the Y electrodes 6 adjacent to each other near the edge portion. However, by forming the shield layer 14 on the surface of the sensor unit 1a to be attached to the base portion 13, the interference of the electrostatic capacitances between the electrodes adjacent to each other near the edge portion is suppressed and, thus, the changes in the voltage of the electrodes can be reduced. As a consequence, the malfunction of the sensor does not occur.

While the disclosure has been shown and described with respect to the embodiments, it will be understood by those skilled in the art that various changes and modifications may be made without departing from the scope of the disclosure as defined in the following claims.

What is claimed is:

1. A touch panel comprising:
   a sensor unit,
   wherein the sensor unit includes:
   a base film stretched by heat;
   an electrode portion, which is made of a mixture of a conductive material and a thermoplastic resin and is formed on at least one surface of the base film; and
   a stretching supporting layer made of a thermoplastic resin to cover the electrode portion, and wherein the touch panel further comprising:
   a shield layer made of a mixture of a conductive material and a thermoplastic resin and formed on a surface of the sensor unit, which is to be attached to a base portion of the touch panel, to cover the sensor unit in a grounded state, and
   an additional stretching supporting layer made of a thermoplastic resin and formed to cover the shield layer.

2. The touch panel of claim 1, wherein the sensor unit is three-dimensionally molded in a predetermined shape by heating.

3. The touch panel of claim 2, wherein the three-dimensionally molded sensor unit is adhered to the base portion through an adhesive layer.

4. A touch panel manufacturing method, wherein the touch panel includes a sensor unit attached to a base portion of the touch panel, the method comprising:
   forming an electrode portion made of a mixture of a conductive film and a thermoplastic resin on at least one surface of a base film that is stretched by heat;
   forming a stretching supporting layer made of a thermoplastic resin to cover the electrode portion;
   forming a shield layer made of a mixture of a conductive material and a thermoplastic resin on a surface of the sensor unit to cover the sensor unit in a grounded state, the surface of the sensor unit being one on the base portion side, and
   forming an additional stretching supporting layer made of a thermoplastic resin to cover the shield layer.

5. The touch panel manufacturing method of claim 3, further comprising three-dimensionally molding a sensor unit including the base film, the electrode portion, and the stretching supporting layer by thermal molding.

* * * * *